ced Films of
United States Patent [19]

Toda et al.

[11] Patent Number: 4,793,679
[45] Date of Patent: Dec. 27, 1988

[54] OPTICAL COUPLING SYSTEM

[75] Inventors: Minoru Toda, Lawrenceville; Gerard A. Alphonse, Princeton, both of N.J.

[73] Assignee: General Electric Company, Schenectady, N.Y.

[21] Appl. No.: 40,976

[22] Filed: Apr. 20, 1987

[51] Int. Cl.[4] .............................................. G02B 6/26
[52] U.S. Cl. .................................. 350/96.15; 350/96.1
[58] Field of Search ................ 250/227; 455/610, 612; 350/96.1, 96.15, 96.16, 96.2, 96.29, 96.30

[56] References Cited

U.S. PATENT DOCUMENTS

| 4,165,496 | 8/1979 | Di Domenico, Jr. et al. | 331/94.5 |
| 4,251,780 | 2/1981 | Scifres et al. | 331/94.5 |
| 4,270,134 | 5/1981 | Takeda et al. | 357/19 |
| 4,294,510 | 10/1981 | Chappell | 350/96.17 |
| 4,432,091 | 2/1984 | Kuroda et al. | 372/45 |
| 4,540,237 | 9/1985 | Winzer | 350/96.15 |

FOREIGN PATENT DOCUMENTS

| 0147862 | 7/1985 | European Pat. Off. | 350/96.15 |
| 2556480 | 6/1985 | France | 350/96.15 |
| 59-24818 | 2/1984 | Japan | 350/96.2 |
| 61-178601 | 8/1986 | Japan | 350/96.1 |

OTHER PUBLICATIONS

L. N. Kurbatov et al., "Investigation of Superluminescence Emitted by a Gallium Arsenide Diode," Soviet Physics-Semiconductors, vol. 4, No. 11, May 1971, pp. 1739-1744.
W. Heitmann, "Reactively Evaporated Films of Scandia and Yttria," Applied Optics, vol. 12, No. 2, Feb. 1973, pp. 394-397.
D. R. Kaplan et al., "Exact Calculation of the Reflection Coefficient for Coated Optical Waveguide Devices," AT&T Bell Laboratories Technical Journal, vol. 63, No. 6, Jul.-Aug. 1984, pp. 857-877.
M. B. Holbrook, "External Cavity Operated Angled-Stripe Geometry DH Lasers," Applied Physics Letter 36(5), Mar. 1, 1980, pp. 349-350.
I. Ladany, "Scandium Oxide Antireflection Coatings for Superluminescent LEDs," Applied Optics, vol. 25, No. 4, Feb. 15, 1986, pp. 472-473.
D. R. Scifres et al., "GaAs/GaAlAs Diode Lasers with Angled Pumping Stripes," IEEE Journal of Quantum Electronics, vol. QE-14, No. 4, Apr. 1978, pp. 223-227.
G. A. Alphonse et al., "High-Power Superluminescent Diodes," OSC Conference, Jan. 19-21, 1987.
J. Nieson et al., "High Power 0.83 um Angle Stripe Superluminescent Diode," Southwest Optics Conference, Feb. 1987.
G. A. Alphonse, "Superluminescent Diode Development," May 1986.
N. K. Dutta et al., "Optical Properties of a GaAlAs Superluminescent Diode," IEEE Journal of Quantum Electronics, vol. QE-19, No. 4, Apr. 1983, pp. 496-498.
I. P. Kaminow et al., "Measurement of the Modal Reflectivity of an Antireflection Coating on a Superluminescent Diode," IEEE Journal of Quantum Electronics, vol. QE-19, No. 4, Apr. 1983, pp. 493-495.

Primary Examiner—John D. Lee
Assistant Examiner—John Ngo
Attorney, Agent, or Firm—William Squire; James C. Davis, Jr.; Paul R. Webb, II

[57] ABSTRACT

An optical coupling system comprises a radiation emitting device and a radiation receiver. The radiation emitting device has an emitting end face and emits radiation having an optical axis of symmetry which is inclined at an output angle relative to the direction perpendicular to the emitting end face. The radiation receiver has a receiving axis and a receiving end face which is inclined at a wedge angle relative to a plane perpendicular to the receiving axis and the receiving end face is positioned adjacent the emitting device. The receiving end face may be first inclined at the wedge angle such that the optical axis of incident radiation is inclined at an angle relative to the normal of the receiving end face. The receiver is then positioned such that the receiving axis is inclined at a receiving angle relative to the normal of the receiving end face such that the radiation propagates about in the direction of the receiving axis.

11 Claims, 1 Drawing Sheet

OPTICAL COUPLING SYSTEM

The government has rights in this invention pursuant to a government contract.

The invention relates to an optical coupling system for coupling emitted radiation from an optical device whose axis of emission is non-perpendicular relative to the plane of the emitting end face.

Of interest are copending applications Ser. No. 040,977 entitled "Super-Luminescent Diode" by G. A. Alphonse et al. Ser. No. 040,979 entitled "Super-Luminescent Diode" by G. A. Alphonse and Ser. No. 040,978 entitled "Low Coherence Optical System Having Reflective Means" by G. A. Alphonse all filed concurrently herewith and assigned to the assignee of the present invention.

BACKGROUND OF THE INVENTION

An optical system typically comprises a light emitting device such as a light-emitting diode (LED), or a super-luminescent diode (SLD) coupled to a radiation receiving device such as an optical fiber. The light-emitting device has an emitting end face and typically the optical axis of the emitted radiation is perpendicular to the emitting end face. The fiber has an end face through which radiation enters the fiber and this fiber end face is typically positioned perpendicular to the optical axis of the device's emitted radiation. Further, the fiber has an optical axis and the fiber is typically positioned such that the fiber's optical axis is perpendicular to the emitting end face. Therefore, the fiber end face is typically parallel and adjacent the emitting end face. Occasionally, the fiber end face is inclined at an angle relative to the direction perpendicular to the fiber axis and the fiber axis is positioned parallel to the optical axis of the device's emitted radiation. Consequently, the differences in refractive index at the fiber end face and the angle of the radiation incident on the fiber end face will result in emitted radiation not being propagated in the direction of the fiber axis, thereby resulting in decreased fiber output.

In some optical devices the axis of symmetry of the emitted radiation is non-perpendicular to the emitting end face such as disclosed by G. A. Alphonse et al., in copending U.S. patent application Ser. No. 040,977 entitled "SUPERLUMINESCENT DIODE" and by G. A. Alphonse, et al. in copending U.S. patent application Ser. No. 040,979 entitled "SUPERLUMINESCENT DIODE AND METHOD OF FORMING SAME". In these devices a large output angle may exist, that being the angle between the optical axis of the emitted radiation and the direction perpendicular to the emitting end face. It is often desirable to couple these devices to a single mode fiber, typically having a core diameter between about 4 to 6 micrometers ($\mu$m) and a fiber acceptance angle between about 8 to 13 degrees. However, when the end face of the fiber is positioned parallel and adjacent the emitting end face, only a small fraction, if any, of the device's emitted radiation is coupled into the fiber due to the device's large output angle and the fiber's small acceptance angle. Accordingly, it would be desirable to have an optical coupling system for coupling radiation into an optical fiber when the optical axis of emitted radiation is non-perpendicular relative to the emitting end face.

SUMMARY OF THE INVENTION

An optical system comprises a light emitting device having an emitting end face. The device emits radiation having an optical axis which is non perpendicular relative to the plane of the emitting end face. A radiation receiver having a receiving end face is positioned adjacent the emitting end face and the receiving end face is non perpendicular relative to an axis of the receiver.

The invention also includes an optical system comprising a radiation emitting device, having an emitting end face through which radiation having an optical axis of symmetry is emitted, and a radiation receiver. The radiation receiver has a receiving axis and a receiving end face which is inclined at a wedge angle relative to a plane perpendicular to the receiving axis. The radiation receiver is positioned such that the receiving axis is inclined at a receiving angle relative to the optical axis such that the radiation propagates in the direction of the receiving axis.

DETAILED DESCRIPTION OF PREFERRED EMBODIMENTS

Figure 1:
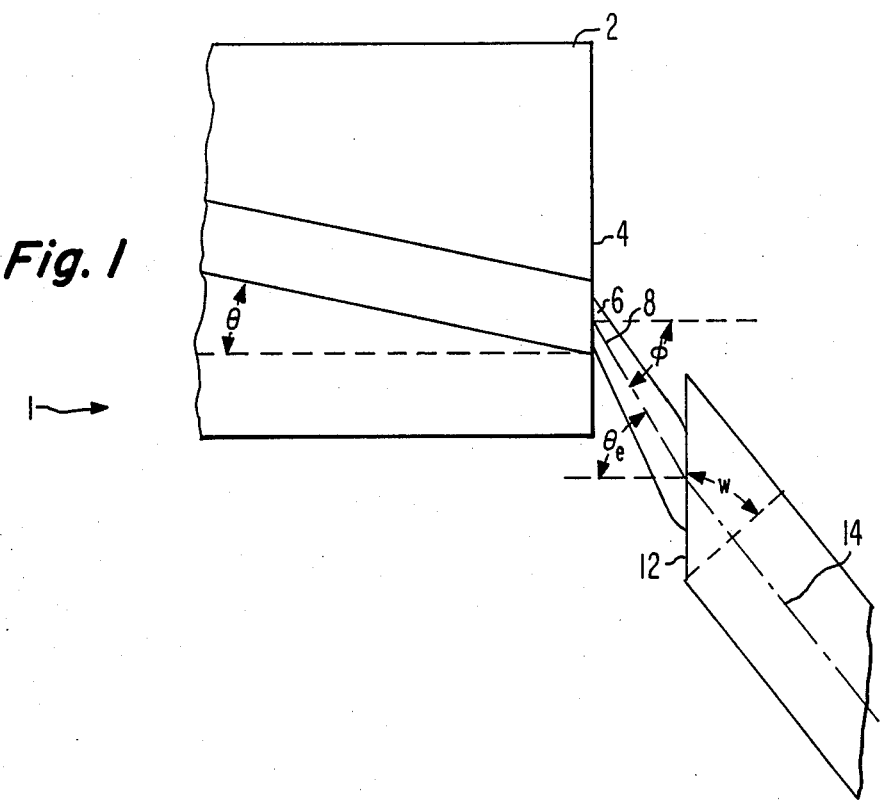
FIGS. 1 and 2 are top views of different embodiments of an optical system of the invention.

As shown in FIG. 1, an optical system 1 comprises a light-emitting device 2 having an emitting end face from which radiation 6 is emitted. The radiation 6 has an optical axis of symmetry 8 which is inclined at an output angle $\phi$ relative to the direction perpendicular to the plane of the emitting end face 4. A radiation receiving device 10 having a receiving end face 12 is positioned such that the receiving end face 12 is adjacent the emitting end face 4. The receiving device 10 has an axis 14 and the receiving end face 12 is inclined at a wedge angle $\omega$ relative to a plane perpendicular to the axis 14. The receiving end face 12 is positioned such that the optical axis 8 of the radiation 6 incident on the receiving end face 12 is inclined at an emitted radiation angle $\theta_e$ relative to the normal of the plane of the receiving end face 12.

The light-emitting device may be any device whose axis of symmetry of emitted radiation is non-perpendicular to its emitting end face such as a light-emitting diode, optical fiber or preferably a superluminescent diode (SLD) such as disclosed by G. A. Alphonse et al. in a copending U.S. patent application Ser. No. 049,977 entitled "SUPERLUMINESCENT DIODE" or a SLD as disclosed by G. A. Alphonse et al. in copending U.S. patent application Ser. No. 040,979 entitled "SUPERLUMINESCENT DIODE AND METHOD OF FORMING SAME." The SLD comprises a body having first and second opposed end faces and sidewalls extending therebetween. The body includes a substrate having a first cladding layer thereon, an active layer overlying the first cladding layer, a second cladding layer overlying the active layer, and a capping layer overlying the second cladding layer. An electrically insulating layer, having an aperture therethrough which extends between the end faces, overlies the capping layer. A means for electrically contacting the body comprises a first electrical contact, which overlies the surface of the substrate opposite the first cladding layer, and a second electrical contact which overlies the capping layer in the aperture. The aperture is inclined at a stripe angle $\theta$ relative to the direction perpendicular to the first and second end faces. The tangent of the stripe angle $\theta$ is greater than or equal to the effective width of the optical beam path which is formed in the device divided by the length of the body. Alternatively, the SLD may comprise a semiconductor body having an optical axis extending between a pair of end faces of the body. At least one of the end faces is inclined at an angle relative to a plane perpendicular to the optical axis.

In these SLDs the optical axis 8 of the emitted radiation 6 will typically be nonperpendicular relative to the emitting end face 4 and the output angle $\phi$ is determined by:

$$\phi = \text{Sin}^{-1} \frac{n_1 \sin \theta}{n_2}$$

Where $n_1$, is the effective refractive index of the device 2 and $n_2$ is the refractive index of the medium adjacent the emitting end face 4. For example, a GaAs device 2 in air having a stripe angle $\theta$ of 16.6° will emit radiation at an output angle $\phi$ of about 73.3° relative to the direction perpendicular to the emitting end face 4.

These large output angles provide for inefficient coupling between the emitting device and the receiving device such as an optical fiber. For instance, if a fiber having a fiber end face perpendicular to the fiber axis is positioned such that the fiber end face is perpendicular to the optical axis of symmetry, the fiber axis will therefore be parallel to the optical axis. In this system a device having an output angle of about 73° will only couple about 1% of the emitted radiation into the fiber. This low coupling efficiency results from the fiber core being prevented from being close to the end face due to the large output angle of the emitted radiation. Accordingly, as shown in FIG. 1, to increase coupling efficiency the receiving end face 12 is positioned parallel with the emitting end face 4. The fiber wedge angle $\omega$ is preferably chosen such that the radiation 6 propagates along the receiving device axis 14 in accordance with:

$$\omega = \text{Sin}^{-1} \frac{n_2 \sin \theta_e}{n_3}$$

where $n_2$ is the refractive index of the medium adjacent the receiving device 10 which is typically air having an index of about 1, $n_3$ is the refractive index of the receiving device which is typically an optical fiber having a refractive index of about 1.45, and $\theta_e$ is angle of the emitted radiation relative to the normal of the receiving end face 12. Thus the wedge angle $\omega$ is typically about 41° for a device in which the angle of the emitted radiation is about 73°. Thus, if a fiber having a wedge angle of about 41° is positioned adjacent an emitting end face having an output angle of about 73°, 28% of the radiation emitted will be coupled into the fiber. The wedge angle $\omega$ also provides additional advantages other than coupling the radiation in the direction of the fiber axis. The wedge angle $\omega$ increases the surface area of the fiber end face and the surface of the fiber core, the core being the region in the fiber in which the radiation propagates Increasing this fiber core surface allows for greater alignment tolerance when aligning the light-emitting device to the fiber. The wedge angle $\omega$ when formed in a fiber also results in a reduced angular spread of the spatial distribution since the optical axis of symmetry of emitted radiation is nonperpendicular to the plane of the fiber end face. This reduced divergence increases the system's coupling efficiency by reducing the amount of radiation entering the fiber having an angle of incidence greater than the critical angle of the fiber and thereby does not propagate within the fiber. For example, in an optical system having an angle of emitted radiation $\theta_e$ of about 73° in which the radiation is coupled to a fiber having a refractive index of about 1.45 and the fiber is positioned in contact with the emitting end face and which has a wedge angle $\omega$ of about 41°, a radiation pattern having a 10° divergence will be reduced to about a 2° divergence inside the fiber core. This reduced divergence would increase the coupling efficiency and increases the output by about 14% as compared to an optical system having no wedge angle inclination.

Figure 2:
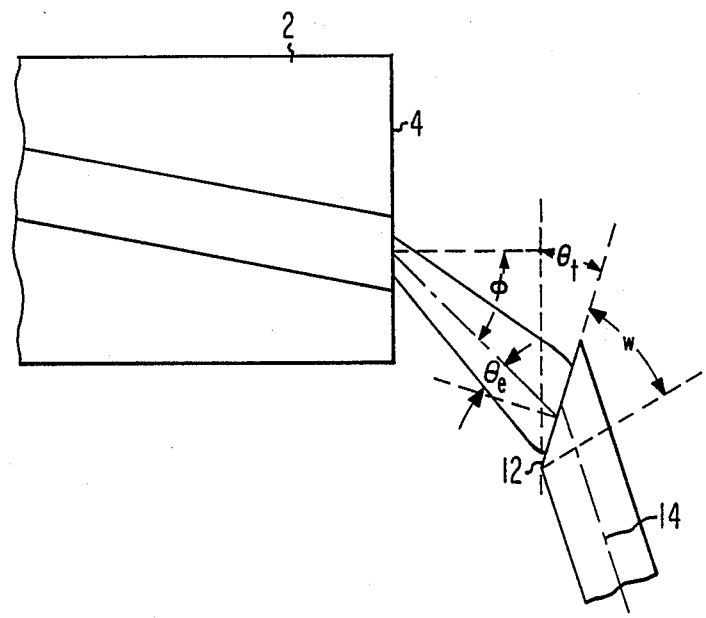

The receiving end face 12 may also be inclined at a tilt angle $\theta_t$ relative to the plane parallel to the emitting end face 4. Preferably, as shown in FIG. 2, this receiving end face 12 is inclined such that the emitted radiation $\theta_e$ incident on the receiving end face 12 is inclined toward a Brewster angle which is equal to the inverse tangent of the refractive index of the receiving device 10 divided by the refractive index of the medium adjacent the receiving end face 12. At the Brewster angle, the radiation vibrating in the plane of incidence is not reflected by the receiving end face 12, thus resulting in radiation propagating within the fiber which is predominantly polarized. Further, at this angle the reflected and refracted rays are 90° apart resulting in low reflection at the receiving end face 12. If the output angle $\phi$ is about 73° and the receiving end face 12 is about parallel with the emitting end face 4, then the emitted radiation angle $\theta_e$ is about 18° deviated from the Brewster angle which is typically about 55° for a fiber-to-air interface. If the receiving end face 12 is inclined 10° toward a Brewster angle, then the reflection at the receiving end face is reduced from about 7.8% to 0.8%. Further, if the receiving end face 12 is inclined 15° toward a Brewster angle then the reflection will be about 0.01%. Typically it is not necessary to incline the receiving end face 12 completely to the Brewster angle, since this will result in only a small reduction in the percentage of reflection as evidenced by the difference in reflection for a 10° and 15° inclination. It should be understood that inclining the receiving end face 12 will require a change to the wedge angle m for propagating the radiation along the axis 14. Alternatively, the receiving end face may be first inclined to a given wedge angle such that the optical axis of incident radiation is inclined at an angle relative to the normal of the receiving end face. Therefore, the radiation receiving device must be positioned such that the receiving axis is inclined at a receiving angle relative to the normal of the receiving end face such that the radiation propagates about in the direction of the receiving axis. This principal is equally applicable to radiation emitting devices whose optical axis is normal to the emitting end face and devices whose optical axis is inclined relative to the normal of the emitting end face.

The light-emitting device and the receiving device are typically mounted using techniques well known in the art. For example, the light-emitting device may be mounted on a heat sink and the heat sink is mounted to a base. A tube composed of a metallic material such a nickel is mounted to a block such that one end of the tube is unsupported by the block. The block assembly is then mounted to the base such that the unsupported tube is adjacent the light-emitting device. The receiving device, such as a fiber is inserted through the tube and the unsupported end of tee tube is moved to bend the tube while monitoring the output of the receiving device to achieve maximum coupling efficiency.

We claim:
1. An optical system comprising:
   a radiation emitting device having a first optical axis and an emitting end face wherein the emitted radiation has an output optical axis of symmetry, said optical axis of symmetry being inclined relative to the direction perpendicular to said emitting end face and relative to said first axis; and
   a radiation receiver having a receiving axis and a receiving end face wherein said receiving end face is inclined at a wedge angle relative to a plane perpendicular to said receiving axis to maximize the amount of radiation received by the receiver, said receiving end face being positioned adjacent said emitting end face so that said emitted radiation is incident upon said receiving end face, said receiver axis being inclined relative to said first axis.

2. The optical system of claim 1 wherein said receiving end face is parallel to said emitting end face.

3. The optical system of claim 1 wherein said wedge angle is formed such that said radiation propagates along said receiving axis.

4. The optical system of claim 3 wherein said wedge angle is about equal to the inverse sine of the refractive index of the medium adjacent the radiation receiver times the sine of angle of the emitted radiation relative to the normal of the receiving end face, divided by the refractive index of the radiation receiver.

5. The optical system of claim 1 wherein said receiving end face is inclined at an angle relative to a plane parallel to said emitting end face.

6. The optical system of claim 5 wherein said receiving end face is inclined toward the Brewster angle.

7. The optical system of claim 1 wherein said optical axis is inclined at an angle of about 73° relative to the direction perpendicular to said emitting end face and said wedge angle is about 41°.

8. The optical system of claim 1 wherein said radiation receiver is an optical fiber.

9. An optical system comprising:
   a radiation emitting device having a first optical axis and an emitting end face through which radiation having an output optical axis of symmetry is emitted, said axis of symmetry being inclined relative to the first optical axis; and
   a radiation receiver having a receiving axis and a receiving end face wherein said receiving end face is inclined at a wedge angle relative to a plane perpendicular to said receiving axis and said radiation receiver is positioned such that said receiving axis is inclined relative to the direction perpendicular to said receiving end face to maximize the amount of said emitted radiation which propagates about in the direction of said receiving axis, said receiver being positioned so that the emitted radiation is incident upon said receiving end face, said receiver axis being inclined relative to said first axis.

10. The optical system of claim 9 wherein said receiving angle is about equal to the inverse sine of the refractive index of the medium adjacent the radiation receiver times the sine of the angle of the emitted radiation relative to the normal of the receiving end face, divided by the refractive index of the radiation receiver.

11. The optical system of claim 9 wherein said radiation receiver is an optical fiber.

* * * * *